(12) United States Patent
Klöti

(10) Patent No.: US 6,613,368 B2
(45) Date of Patent: Sep. 2, 2003

(54) DOG BEVERAGE

(76) Inventor: Albert Klöti, Messerschmittstrasse 1, 86453 Dasing (DE)

( * ) Notice: Subject to any disclaimer, the term of this patent is extended or adjusted under 35 U.S.C. 154(b) by 57 days.

(21) Appl. No.: 09/974,709

(22) Filed: Oct. 10, 2001

(65) Prior Publication Data

US 2002/0054947 A1 May 9, 2002

Related U.S. Application Data

(63) Continuation-in-part of application No. PCT/EP00/12971, filed on Dec. 20, 2000.

(30) Foreign Application Priority Data

Feb. 11, 2000 (DE) .......................................... 100 06 086

(51) Int. Cl.⁷ ................................................ A23K 1/00
(52) U.S. Cl. ......................... 426/74; 426/574; 426/596; 426/650; 426/656; 426/805
(58) Field of Search ................................ 426/596, 656, 426/805, 574, 74, 650

(56) References Cited

U.S. PATENT DOCUMENTS

| | | | | |
|---|---|---|---|---|
| 4,309,417 A | * | 1/1982 | Staples | 424/128 |
| 4,883,672 A | * | 11/1989 | Shug et al. | 426/2 |
| 5,114,723 A | * | 5/1992 | Stray-Gundersen | 426/74 |
| 5,538,743 A | * | 7/1996 | Heinemann et al. | 426/42 |
| 5,922,375 A | * | 7/1999 | Luchansky et al. | 426/61 |
| 5,968,569 A | * | 10/1999 | Cavadini et al. | 426/61 |
| 6,156,355 A | * | 12/2000 | Shields, Jr. et al. | 426/74 |
| 6,423,360 B1 | * | 7/2002 | Lied | 426/590 |
| 6,479,069 B1 | * | 11/2002 | Hamilton | 424/439 |

FOREIGN PATENT DOCUMENTS

| | | | |
|---|---|---|---|
| DE | 4320816 | * | 8/1994 |
| EP | 0241097 | * | 10/1987 |

OTHER PUBLICATIONS

Aparna et al., Food Reviews International, vol. 15(4), pp. 455–471, 1999.*

* cited by examiner

Primary Examiner—Chhaya Sayala
(74) Attorney, Agent, or Firm—Klaus J. Bach

(57) ABSTRACT

In a preparation for a beverage for dogs in a liquid or a solid form for dissolution in water, there are included in the beverage at least flavor carriers, minerals and proteins and other constituents.

10 Claims, No Drawings

DOG BEVERAGE

This is a continuation-in-part-application of international application PCT/EP00/12971 filed Dec. 20, 2000 and claiming the priority of German application 100 06 086.2 filed Feb. 11, 2000.

BACKGROUND OF THE INVENTION

The invention comprises a beverage preparation for dogs. It is the object of the invention to provide a liquid food for dogs, which can reasonably supplement the nutrient requirement of dogs, which furthermore promotes adequate fluid intake and which is also especially suitable for use on the road.

SUMMARY OF THE INVENTION

In a preparation for a beverage for dogs in a liquid or a solid form for dissolution in water, there are included in the beverage at least flavor carriers, minerals and proteins and other constituents.

The liquid preparation according to the invention can, in particular, be used as a beverage but can also be used for mixing instant food in flake form.

The liquid preparation can be present in a ready-to-drink or ready-to-use aqueous solution and be filled, for example, into cans as they are also used as beverage cans. In this form, the dog beverage can be easily stored and transported and is especially also suitable for use on the road.

Furthermore, the preparation can also be present in liquid form as a concentrate, which can be converted into a ready-to-drink or ready-to-use form by dilution with water.

Furthermore, the preparation can be present as a solid extract, for example, by freeze-drying in granular or powder form or it may be present in solid form pressed into tablets. For use, the granular material or powder and/or a tablet is dissolved in water and thus is converted into a ready-to-drink product. The advantage of these solid forms of the preparation is increased shelf life and small space requirement.

As a dog beverage, the preparation according to the invention offers the following important advantages for the dog owner:

The dog beverage can induce the dog to increase its fluid intake, because the delicious taste of the beverages results in increased drinking. This can be especially important with high fluid losses when the dog is physically stressed during dry weather with high temperatures, for example, by sports or training. Furthermore, the beverage is suitable for mixing with food constituents, which have only limited acceptance, for example, flakes or rice, and for soaking dry food. In this way, the dog can also be encouraged to eat when, for medical reasons, unpleasantly tasting medications have to be mixed with the food.

The constituents of which the recipe for the dog beverage according to the invention can consist and the significance of the individual constituents of the preparation can be found in the following description.

DESCRIPTION OF PREFERRED EMBODIMENTS

Essential constituents of the dog beverage according to the invention are flavorings, minerals and proteins.

Possible flavorings are, in particular, meat extract or broth, whey powder and commercial seasonings. Meat extract or broth is very tasty for the dog. They also contain proteins, which, however, should actually be present in rather negligible amounts. Whey powder contains valuable constituents of milk and is especially tasty. Commercial seasonings for dogs or cats are known and are already used in instant meals for animals.

Minerals are important for mineral supplements in food and also with respect to the electrolyte metabolism.

Proteins are also of significance for food supplements. Amino acid mixtures such as e.g. taurine, lysine, among others, are suitable. They serve to supplement the food with specific essential amino acids as protein, which can not be synthesized by the dog itself. This can also take into consideration an increased protein requirement, e.g. for muscle building, during sports and training, during growth, pregnancy or nursing. These can also compensate for inferior protein sources during feeding, e.g. with connective-tissue rich slaughtering scraps and predominantly vegetarian food. Peptone mixtures are also possible. These are enzymatically prepared, i.e. split, proteins. They result in an enhanced taste for the dog and contribute to the protein supply via protein fragments.

A further constituent of the dog beverage according to the invention can be carbohydrates, e.g. in the form of glucose, as easily usable, highly digestive energy supplier.

Further advantageous constituents are vitamins, i.e. above all water-soluble vitamins such as vitamin B complex and also vitamin C. These are also not detrimental in the case of overdoses or too high an intake. They can supplement the vitamin intake provided by the food.

Furthermore, soluble fibrous substances such as e.g. oligofructose saccharides or insoluble fibrous substances can be contained as constituents in the beverage. These have a positive effect on digestion. They stabilize the flora of the colon by substrate provision and thus positively affect the mucous membrane of the colon.

Carnitine can also be contained in the beverage. L-carnitine promotes the fat transport into the liver and thus fat utilization. This is especially advantageous in animals with high-energy conversion, i.e. in dogs that do a lot of sports, working dogs, in pregnant and nursing female dogs. It can also advantageously contribute to weight reduction.

A further possible constituent is yogurt, which can be used in powdered and lyophilized form. Yogurt contains valuable constituents of milk and is, moreover, tasty.

Finally, the beverage can also contain honey.

The recipe for the dog beverage according to the invention comprises at least the aforementioned essential constituents, i.e. flavorings, mineral substances and proteins, but also others of the constituents noted in detail above can be selected for the beverage which may not all be mentioned herein, but which are equivalent.

Advantageously, the additional constituents can be provided both for perfecting the taste and completing the nutrient scale.

If the preparation is present in liquid, i.e. ready-to-drink or in concentrated form, for example, filled in cans, it is of course necessary to preserve it by appropriate measures such as pasteurization. When the preparation is present in the form of a dry substance, then high shelf life is given by its very nature.

What is claimed is:

1. A beverage preparation for dogs in a tablet-pressed form which is ready for dissolution in water, said preparation consisting at least of a mixture of flavor carriers, minerals proteins, whey powder and vitamins.

2. A preparation according to claim 1, wherein said tablets are produced by freeze-drying and dry pressing said mixture.

3. A preparation according to claim 1, wherein said preparation further includes at least one of meat extract, broth, and commercial seasonings as flavor carriers.

4. A preparation according to claim 1, wherein at least one of amino acid mixtures and peptone mixtures are used as protein elements.

5. A preparation according to claim 1, wherein at least one of soluble and insoluble fibrous substances are contained in the preparation.

6. A preparation according to claim 5, wherein soluble fibrous substances in the form of oligofructose saccharides are contained in the preparation.

7. A preparation according to claim 1, wherein carbohydrates, in the form of glucose, are contained in the preparation.

8. A preparation according to claim 1, wherein carnitine is contained in the preparation.

9. A preparation according to claim 1, wherein yogurt is contained in the preparation in one of a powdered and a lyophilized form.

10. A preparation according to claim 1, wherein honey is contained in the preparation.

* * * * *